United States Patent [19]

Richardson

[11] 4,026,026

[45] May 31, 1977

[54] APPARATUS FOR SUPPORTING RECEPTACLES FOR TRANSPOSITION

[76] Inventor: Howard M. Richardson, 2807 Benner St., Philadelphia, Pa. 19116

[22] Filed: Dec. 2, 1975

[21] Appl. No.: 636,924

[52] U.S. Cl. .................................................... 32/22

[51] Int. Cl.$^2$ .......................................... A61C 19/02

[58] Field of Search ................ 32/22; 248/282, 283

[56] References Cited

UNITED STATES PATENTS

| | | | |
|---|---|---|---|
| 1,136,322 | 4/1915 | Ensor | 248/282 |
| 3,346,957 | 10/1967 | Maurer et al. | 32/22 |
| 3,550,892 | 12/1970 | Propst | 248/282 |

*Primary Examiner*—G.E. McNeill

*Attorney, Agent, or Firm*—Robert K. Youtie

[57] ABSTRACT

In an arrangement of receptacles for groups of dental instruments or other devices where one group is preferably adjacent a work station for a right-handed operator and the other group is preferably adjacent a station for a left-handed operator, the receptacles are pivotally mounted at opposite ends of a rotatable link such that pivoting the receptacles reversely and rotating the link will transpose the left receptacle to the right and the right receptacle to the left.

22 Claims, 10 Drawing Figures

APPARATUS FOR SUPPORTING RECEPTACLES FOR TRANSPOSITION

BACKGROUND OF THE INVENTION

This invention relates to apparatus for supporting a pair of receptacles in such manner as to make them conveniently accessible to a right or left-handed operator. The invention is useful in the medical and other fields and is especially useful to dentists.

Dental instrument such as handpieces, syringes, high volume evacuators and saliva ejectors having been held in a unit or receptacle that is on a universally movable support so the dentist can position the unit over a patient in a dental chair and have access to any one of the instruments. An arrangement of the instruments which is most advantageous from the viewpoint of accessibility to a right-handed operator may be disadvantageous and inconvenient to a left handed operator. A right-handed dentist may want the handpieces nearest to him and the other instruments more remote from him. A left handed dentist may want the opposite arrangement. A dental equipment manufacturer would have to provide two kinds of units in which the instruments are arranged oppositely for left and right handed dentists in order to afford each of them equally convenient access to their instruments. There are obvious economic disadvantages to manufacturing right and left handed units. Moreover, in some dental offices, right and left handed dentists use the same equipment alternately so if the instruments are arranged to the advantage of the right handed dentist they will be the disadvantage of the left handed dentist and vice versa.

SUMMARY OF THE INVENTION

A general object of the present invention is to overcome the above noted disadvantages, not only for dentists, but for other medical practitioners and for anyone who is obliged to access instruments or articles from receptacles where there is advantage in having one of a pair of receptacles on one side for a left handed operator and on the other side for a right handed operator, by providing means that permit transposition of the receptacles from one side to another.

A more specific object is to provide for mounting a pair of receptacles in juxtaposition to give the appearance of a unitary receptacle and to preserve that appearance even though the receptacles are transposed between right and left hand positions.

Still another object of the new receptacle supporting apparatus is to provide for convenient positioning of article containers such as trays which the dentist or other user usually likes to have within reach for holding articles incidental to conducting dental or other procedures.

Still another object of the invention is to facilitate running flexible tubes for furnishing dental instruments in the unit with vacuum, water, pressurized gas and electric services where the tubes do not undergo substantial twisting regardless of the position in which the receptacles are angulated.

A further object is to provide, at one end of at least one of the receptacles, a member which can be touched by the same hand with which the dentist is withdrawing one of the instruments such that the touch will activate the instrument that is withdrawn.

In general terms, the dental unit embodiment of the new support apparatus comprises a link that is mounted for rotation about a vertical axis. The receptacles comprising the unit are pivotally mounted near opposite ends of the link for pivoting or swinging about vertical axes in a generally horizontal plane. For the sake of appearance, the receptacles preferably have the same width and have straight parallel sides with their pivot points centrally located on their ends and symmetrical about the rotational axis of the link. When the receptacles are disposed, in left and right hand positions, respectively, the sides may be placed in abutment to afford the appearance of a unitary structure. The receptacles may be transposed from right to left and vice versa by swinging them individually on their pivots through about a 180° angle and then rotating the link and the receptacles jointly through an angle of about 180° to effect the transposition.

The apparatus also provides for supporting container means such as trays for articles useful to the dentist or other operator, in proximity with the swinging receptacles. In one case a tray is mounted on a telescoping arm disposed below the receptacles such that it may be brought forward for access to instruments or supplies or the receptacles may be angularly diverged to permit access. In another case, the receptacles are pivoted to create an angle between them and a tray, having correspondingly angulated sides, is supported from each of the receptacles in a fashion that bridges the angular gap between them.

How the foregoing and other more specific objects of the invention are achieved will be evident in the ensuing more detailed description of a preferred embodiment of the invention in reference to the drawings.

DESCRIPTION OF A PREFERRED EMBODIMENT

Figure 1:
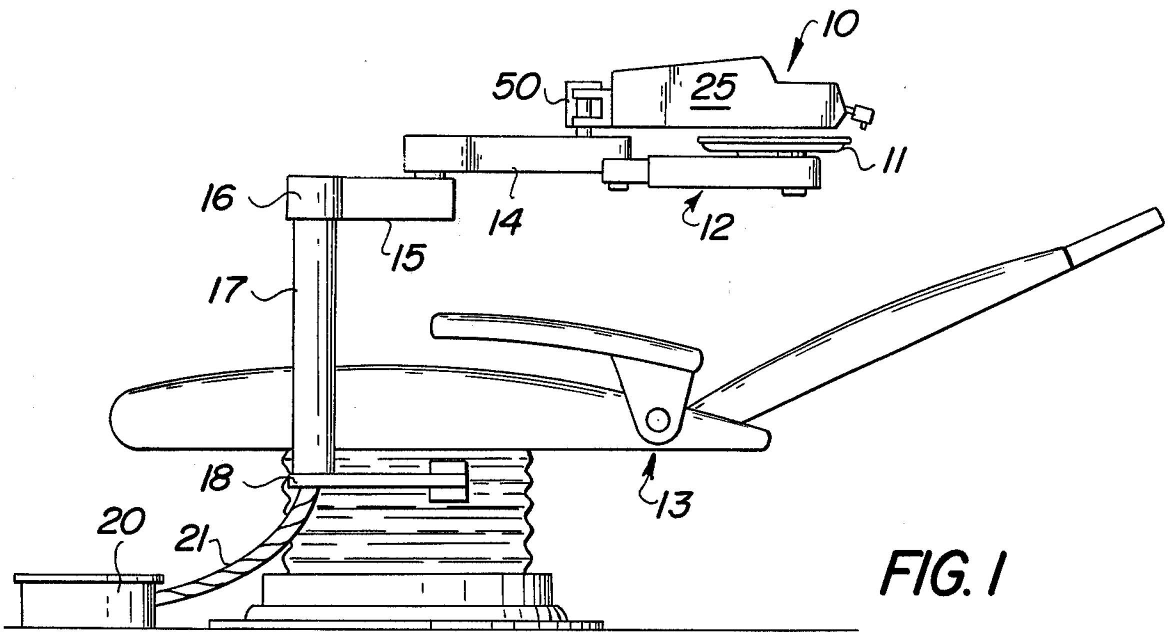
FIG. 1 is a side elevation view of the new instrument receptacle support disposed over a dental chair.

In FIG. 1 a dental operatory unit 10 comprised of a pair of instrument receptacles and a tray 11 supported on a telescoping arm 12 extend over a dental chair 13. The unit 10 and tray arm 12 are supported on a horizontally swingable arm 14 which is articulated with another horizontally swingable arm 15. Arm 15 is pivotally connected in a bearing structure 16 to a vertical column 17. The column 17 is supported rigidly from a bracket 18 that extends from the base 19 of the dental chair. A service box 20 is mounted on the floor and a tube or sheath 21 extends from the service box into column 17. Sheath 21 encloses a plurality of flexible tubes for providing air, vacuum, water and electric service, various dental instruments and other functional devices in unit 10 as will be discussed more fully later. Column 17 and arms 15 and 14 serve as a conduit for the flexible tubes in addition to supporting the receptacle unit 10 and tray 11.

Figure 2:
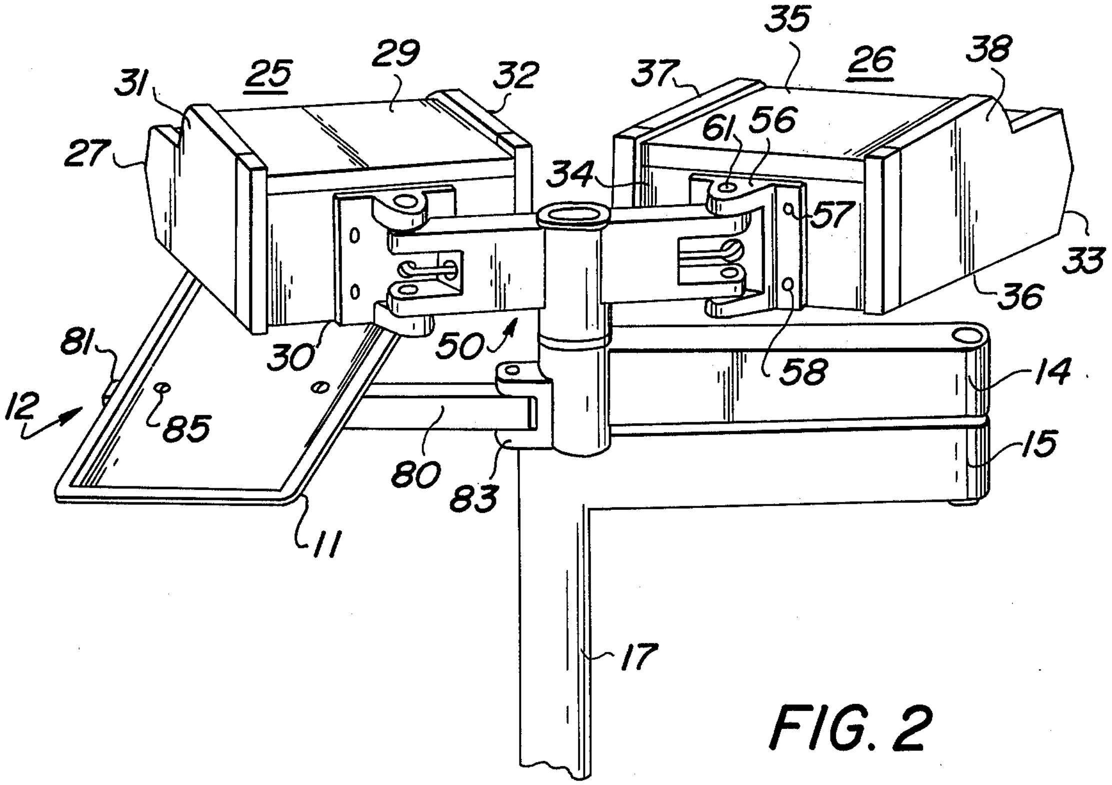
FIG. 2 shows a portion of the supporting column, the articulated horizontally swingable arms mounted thereon, a tray, the pivoting link and a rear view of the instrument receptacles mounted thereon.
Figure 3:
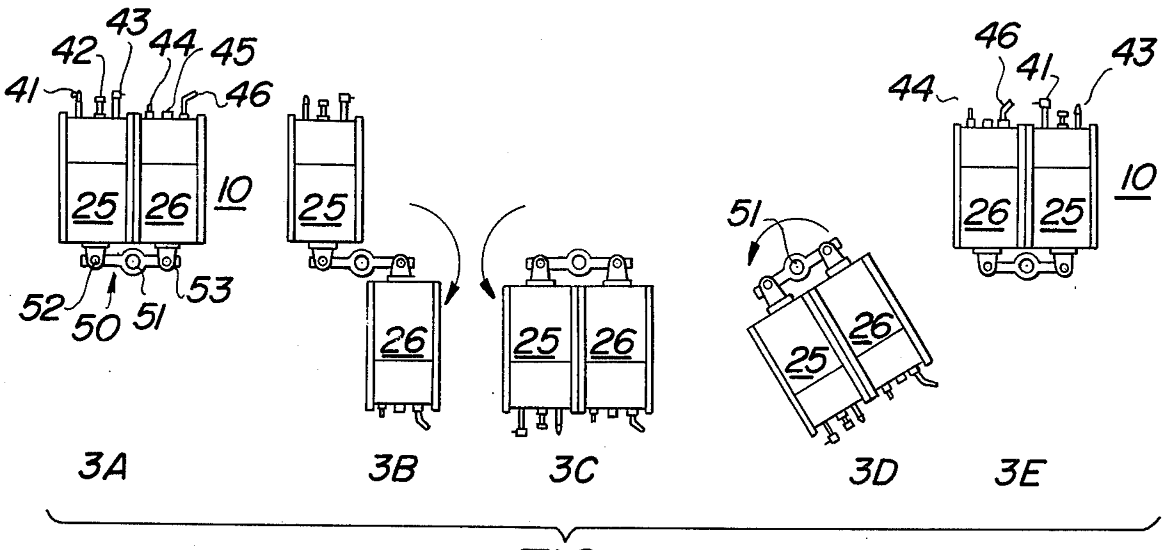
FIG. 3, composed of parts 3A-3E, shows diagrammatically the sequence of steps involved in transposing receptacles, mounted in accordance with the invention, between right and left hand positions.
Figure 4:
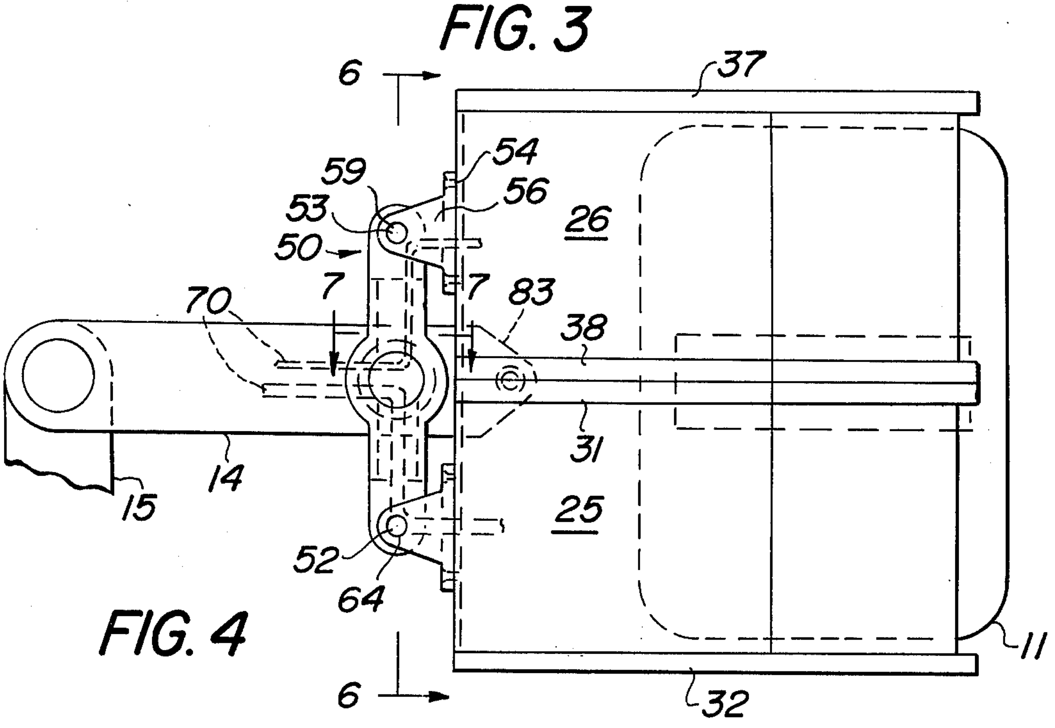
FIG. 4 is a plan view of receptacles mounted in accordance with the invention.

Unit 10 is comprised of two individual receptacles which are designated generally by the reference numerals 25 and 26 as is evident in FIGS. 2–5. Receptacle 25 is comprised of a front end 27, a rear end or wall 28, a top 29, a closed bottom 30 and straight parallel side walls 31 and 32. Receptacle 26 is generally similar and comprises a front end 33, a rear end 34, a top 35, a closed bottom 36 and straight side walls 37 and 38. In FIGS. 1 and 4, receptacles 25 and 26 are shown in juxtaposed abutting relationship with one side wall 37 of receptacle 26 in contact with a side wall 32 of receptacle 25. In FIG. 2 receptacles 25 and 26 are angulated to afford an opportunity to show their rear ends.

Before discussing the structural details of the dental unit or receptacle mounting means, a general description of the structure and operating mode will be discussed in reference to FIG. 3 to which attention is now directed. Referring to part 3A of FIG. 3, for illustrative purposes receptacle 25 has extending from its front end three dental handpieces 41, 42 and 43 and receptacle 26 has extending from its front end other dental instrumentalities such as a saliva ejector 44, a suction line 45 and a chip blower nozzle or syringe 46. Assume that receptacles 25 and 26 are extending over a patient in a dental chair. A right-handed dentist standing or sitting at the patient's right side will usually want the receptacle containing the dental handpieces 41–43 nearest to him and the receptacle 26 containing appliances 44–46 farthest from him and most conveniently placed for access by a technician standing at the opposite side of the chair. A left-handed dentist would want the receptacles transposed so the dental handpieces 41–43 are nearest to him. Both dentists might want to spread the receptacles at an angle which to them affords most convenient access to their instruments. Splitting the operatory unit 10 into two receptacles 25 and 26 as in the present invention makes this possible.

In accordance with the invention, the receptacles are mounted for transposition or exchange from right to left-hand positions. Referring to part 3A of FIG. 3, it will be seen that the receptacles are mounted on a link 50 which is supported on horizontally swingable arm 14 for rotation in a horizontal plane about a vertical axis 51. Receptacle 25 is connected to link 50 for rotation about a vertical axis 52 and receptacle 26 is connected to link 50 for rotation about a vertical axis 53. As viewed in part 3A of FIG. 3, dental handpieces 41–43 are in the left receptacle and the other appliances 44–46 are in the right receptacle. To transpose receptacles 25 and 26 from their left and right, respectively, positions shown in part 3A to opposite positions as in part 3E, the sequence of steps illustrated in parts 3B, 3C and 3D is carried out. First of all, one of the receptacles such as 26 in part 3B is angulated through about 180° so its formerly front end is now at the rear. The other receptacle 25 is then similarly rotated so that they both have their formerly front ends disposed rearwardly as in part 3C. At this time, link 50 need not be rotated and receptacles 25 and 26 are still on the left and right sides, respectively, of link axis 51. Then, as in part 3D, both receptacles 25 and 26 and link 50 are revolved about the axis 51 of the link until, as in part 3E, receptacle 26 is on the left side and receptacle 25 is on the right side as opposed to the converse situation that existed in part 3A.

Of course, the above discussed procedure is merely illustrative. The receptacles could have first been revolved jointly with link 50 about the link axis 51 to reverse the direction of the receptacles and then the receptacles could have been transposed alternately from left to right by pivoting them individually about their axes 52 and 53.

Figure 5:
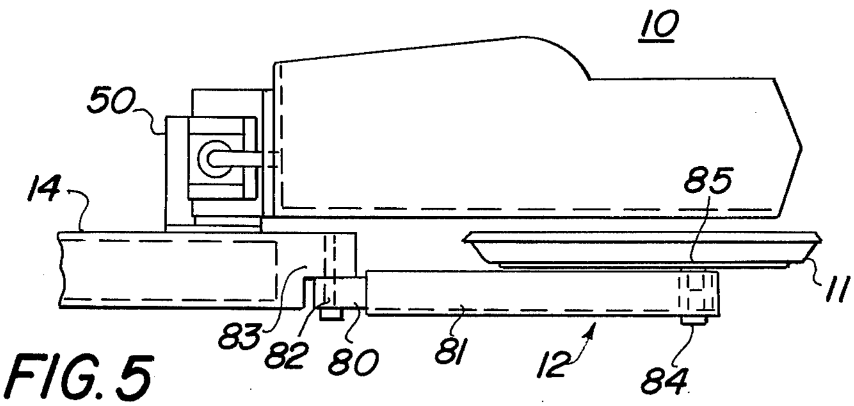
FIG. 5 is a side elevation view of the assembly shown in FIG. 4.
Figure 6:
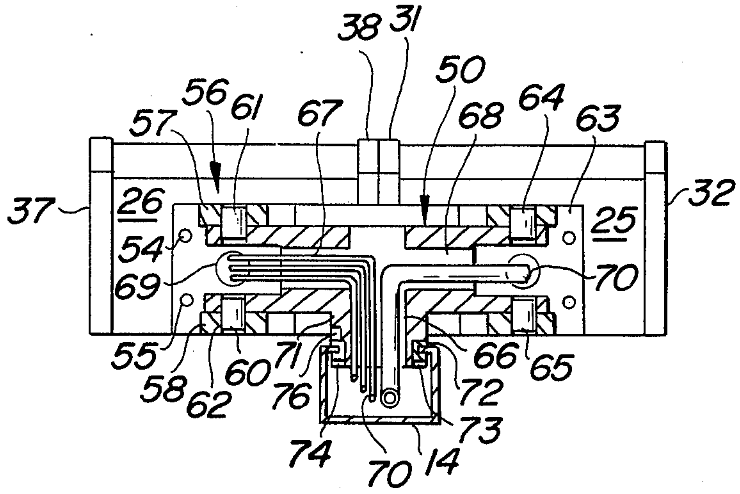
FIG. 6 is a vertical section taken on the line 6—6 in FIG. 4.

A more detailed description of the articulated dental unit 10 support will now be set forth in reference to FIGS. 2, 4, 5, 6 and 7. In FIGS. 2 and 6 it is evident that the rear ends of each of the receptacles are substantially the same and are similarly connected to link 50. The pivotal connection between typical receptacle 26 and link 50 is made with a bracket 56 which is fastened to the rear wall 34 of the receptacle by means of screws such as 54 and 55. The bracket has upper and lower horizontal extensions 57 and 58 in which pintle pins 59 and 60 are fixed. The ends of link 50 are bifurcated and are provided with suitable bearing holes 61 and 62 in which there are preferably bushings made of nylon or other suitable bearing material so that the receptacles supported on the bracket 56 will swing freely about the vertical axis of pintle pins 60 and 61. Receptacle 25 is similarly connected to link 50 with a bracket 63 for rotating on pintle pins 64 and 65. The aligned axes of pintle pins 60 and 61 correspond with pivot axis 53 in FIG. 3 and the axis of pintle pins 64 and 65 corresponds with pivot axis 52. In this embodiment, the radial distances from the pintle pins 60, 61 and 64, 65, respectively, to the rotational axis 51 of link 50 are equal since the widths of the receptacle are equal but unequal radii could be used in designs where it is not important to let the receptacles abut so they appear to be a single unit.

Revolving link 50 is symmetrical about its vertical axis 51 and it has a vertical extension 71 with a bore 66 connected to radially oppositely extending bores 67 and 68. As can be seen particularly well in FIG. 6, a plurality of flexible tubes 70 extend upwardly from hollow arm 14 through central bore 66. Some of the tubes go through a hole 69 in bracket 56 and the back of receptacle 26 while other of the tubes go through a hole 70 in bracket 63 and the back of receptacle 25. The tubes, of course, are for providing vacuum, air pressure, saliva suction and water to operate the various dental appliances held in the receptacles.

Link 50 is journalled for rotation on its vertical extension 71 at the end of arm 14. Extension 71 projects through a hole in arm 14 and is suitably shouldered to provide a bearing surface. A low friction nylon bearing ring 72 is interposed between the shoulder and the arm hole. There is another nylon ring 73 acting as a lower bearing. The reduced end portion of extension 71 is threaded and accommodates an internally threaded lock nut 74 which secures link 50 to arm 14.

Figure 7:
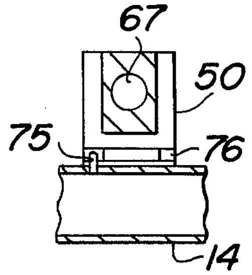
FIG. 7 is a vertical section taken on the line 7—7 of FIG. 4, showing the stop pin in the link pivot.

If link 50 were turned in the same direction several times during the process of transposing the receptacles, the flexible tubes 70 might twist tightly and would be vulnerable to breaking. Hence, it is desirable to limit rotation of link 50 to about 180° in clockwise and counterclockwise directions rather than permit 360° rotation. For this purpose, as can be seen in FIG. 7, the top of arm 14 has a pin 75 extending from it into a semi-annular groove 76 in the periphery of extension 71 of link 50. The link is stopped by pin 75 at either end of about 180° of link rotation in this embodiment.

In FIGS. 2–6, it is evident that receptacles 25 and 26 have equal widths and that they are mounted on the ends of link 50 symmetrically about its rotational axis so that their side walls such as 32 and 37 or 31 and 38 may be placed in contact throughout their lengths. This results in the receptacles 25 and 26 producing the appearance of a unitary device without any space between the receptacles.

The manner in which article container means such as a tray may be positioned most advantageously for a dentist will now be discussed in reference to FIGS. 1, 2, 4 and 5. The tray 11 is supported on a telescoping arm assembly 12 comprised of an inner pivotally mounted inside arm 80 and an outside arm 81 which is slidable thereon. The inner end of the arm 80 has a pin 82 which serves as a pivot. Pin 82 is threaded into a clevis 83 which is fastened to the outer end of horizontally swinging arm 14 as can be seen particularly well in FIG. 5. The tray 11 is also supported on the telescoping arm assembly 12 by means of a post 84 which extends through the outer end of telescoping arm section 81 such that the tray may be secured to the post with a screw 85. It will be evident that the tray 11 can be swung through a substantial horizontal angle and that it can be stored under receptacles 25 and 26 comprising unit 10. The tray can be exposed for access either by pivoting the receptacles to a divergent angle or by drawing it out forward of the receptacles on the telescoping arm assembly 12. The arrangement permits getting the receptacles out of the way when they are not in use while the tray may remain extended conveniently near the patient. In FIGS. 1, 4 and 5 the tray is shown in stored position. It will be evident that the tray arrangement just described can be used advantageously with a single receptacle operatory unit as well as with two receptacles. In either case the tray could be positioned over the patient or moved out of the way by pivoting it or properly folding or unfolding articulated arms 14 and 15.

In some instances, where there is no desire to produce the appearance that the receptacles are unitary, they may have different widths and even different configurations. The pivots of the receptacles on the revolving link conceivable that in some cases the axis of the link 50 may be horizontally disposed such that the receptacles may swing in a vertical plane rather than in a horizontal plane as in the illustrative embodiment of the new receptacle transposing apparatus.

Figure 8:
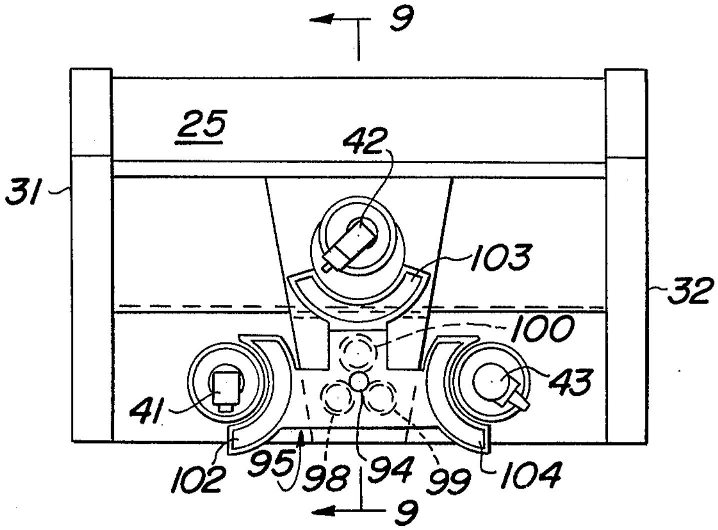
FIG. 8 is a front elevation view of a receptacle in which there are dental handpieces.
Figure 9:
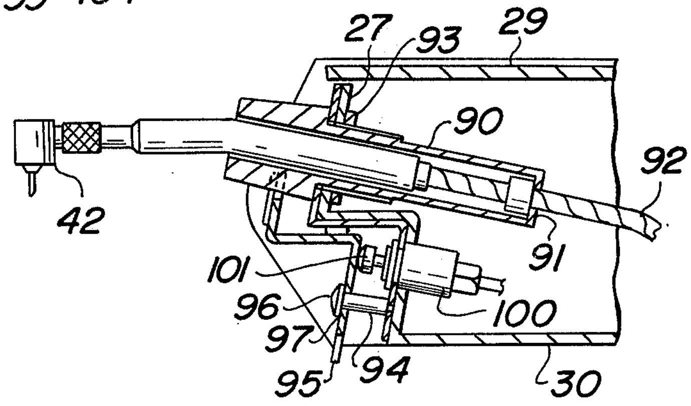
FIG. 9 is a partial vertical section taken on the line 9—9 of FIG. 8.

The new dental operatory unit also provides for convenient activation of the various instruments that are withdrawn from the receptacles by the dentist. In FIG. 8, the outer ends of dental handpieces 41–43 are shown extending from the front of a typical receptacle 25. In FIG. 9, a socket 90 is shown for holding one of the handpieces 42. The socket has a hole 91 in its lower end through which a flexible tube or tubes 92 may extend for providing vacuum operating power to the handpiece. Holder 90 is secured to the front wAll 27 of the receptacle with a lock nut 93. A post 94 is mounted on front wall 27 of the receptacle and a three-winged rocking plate 95 is carried by post 94. Post 94 has a retaining head 96 and the rocking plate 95 has a hole 97 which fits loosely over the post. There are three valves 98, 99 and 100 disposed equiangularly around the post as can be seen in FIG. 8. All of the valves are similarly constructed and, as typified by valve 100 in FIG. 9, each has a headed plunger or stem 101 that is spring biased outwardly so as to impose pressure against the inside surface of rocking plate 95. The three biased valve plungers normally hold the rocking plate in a stable state. When a valve plunger is pressed inwardly in opposition to its spring bias, the handpiece associated with this valve becomes activated.

In FIG. 8 it is evident that each wing of the rocking plate 95 terminates in respective arcuate areas or operating zones 102, 103 and 104 immediately adjacent the handpieces 41–43. Pressing on any one of the arcuate areas causes plate 95 to rock and depress the plunger on the associated valve so that the related handpiece is activated. For example, if the arcuate area 103 has a force applied substantially perpendicular to it as in FIG. 8, the plunger of valve 100 will be depressed and handpiece 42 will be activated. Upon this event, rocking plate 95 will not depress the plungers of valves 98 and 99 so their associated handpieces will remain deactivated. Thus, the dentist need not be distracted by having to operate an activating valve with one hand while he is grasping a handpiece with the other as was the case in prior art dental units. With the apparatus described in references to FIGS. 8 and 9, the dentist may grasp a handpiece such as 42 between two of his fingers while a knuckle of another finger contacts the adjacent arcuate area 103 of the rocking plate so as to depress the plunger of valve 100 and activate the handpiece simultaneously. Means, not shown, are provided in the receptacles for deactivating the handpiece when it is restored to the socket. Such means are known in the art.

Figure 10:
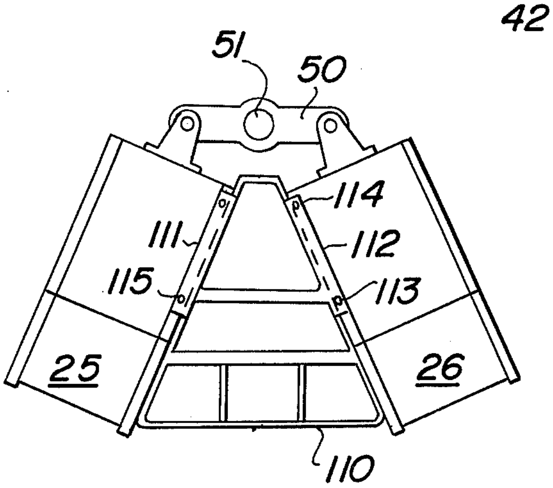
FIG. 10 is a plan view of two receptacles with a tray disposed between them.

FIG. 10 shows an arrangement for providing a tray within reach of the dentist that is alternative to or may be supplementary to the tray arrangement depicted in FIGS. 1, 2, 4 and 5. In the FIG. 10 embodiment, tray 110 has a generally triangular configuration. It has marginal flanges 111 and 112 in which there are pairs of holes such as 113 and 114 that enable the tray to be supported on the side walls of the receptacles by means of upstanding pins 115 which project from the receptacle side walls in pairs. Except for the presence of the tray supportng pins, the receptacles 25 and 26 may be similar to those which were previously described. It will be evident in FIG. 10 that to transpose the left receptacle 25 to the right position and the right receptacle 26 to the left position, the tray 110 must be removed at least until the receptacles are swung rearwardly on link 50 to the same angle in which they appear in FIG. 10. The tray may then be put in position and link 50 may be rotated to effect receptacle transposition.

In summary, the basic elements of the invention are a link rotatable about an axis with receptacles mounted for pivoting about the free ends of the link, respectively, such that the receptacles may be swung from a frontward direction to a rearward direction after which the link may be rotated to bring about transposition of the receptacles from one side to the other of a plane containing the rotational axes of the link. In the illustrative dental unit embodiment described herein, the link is mounted for pivoting on a hollow arm which is articulated to another arm and pivots on a stationary column. The service tubes for appliances in the receptacles runs through the column 17 and the articulated arms 14 and 15 and the link 50 to the respective receptacles 25 and 26. In one embodiment an extensible and contractible tray is supported in a plane below the receptacles so that supplies may be made available from the tray to the dentist and his cooperating technician. In another embodiment, the tray is disposed between the receptacles in a plane near the top thereof. New means are also provided for activating dental instruments simultaneously with withdrawing them from a receptacle where only one hand needs to be used for performing both functions.

Although the new receptacles support has been described as a dental operatory unit, such description is intended to be illustrative rather than limiting for the invention may be variously embodied and it to be limited only by construction of the claims which follow. For instance, the box-like receptacle may have other forms and they may bė equipped with instruments used by medical and dental specialits such as dental hygenists, oral surgeons, periodontists, electrosurgeons and others where right and left handedness has to be accommodated or where the user prefers to have the option of being able to exchange the positions of instruments.

I claim:

1. Apparatus for supporting receptacle means, comprising:

articulated arm means on which said link means is supported for rotation, link means having a first rotational axis, and receptacle means, respectively pivotally connected to said link means on opposite sides of said first axis, whereby said receptacle means may be transposed from one side to the other of a plane containing said first axis by selectively pivoting said receptacle means about their axes and revolving said arm means about its axis, container means for being supported on said receptacle means, said container means being constructed and arranged for being interposed between said receptacle means when said receptacle means are pivoted to a predetermined position, and means for engaging said container means with at least one of said receptacle means.

2. The apparatus as in claim 1 including:

other arm means including means for pivotally connecting said other arm means to said articulated arm means and container means supported on said other arm means.

3. The apparatus as in claim 1 wherein said container means comprises a tray.

4. The apparatus as in claim 2 wherein:

said other arm means comprises arm members slidably engaged with each other, said container means being mounted on one of said members whereby said container means may be advanced and retracted relative to pivotal connecting means.

5. The apparatus as in claim 2 wherein said container means comprises a tray.

6. Apparatus for supporting receptacle means, comprising:

articulated arm means on which said link means is supported for rotation, link means having a first rotational axis, and receptacle means, respectively pivotally connected to said link means on opposite sides of said first axis, whereby said receptacle means may be transposed from one side to the other of a plane containing said first axis by selectively pivoting said receptacle means about their axes and revolving said arm means about its axis, container means constructed and arranged for being supported jointly by and between said receptacle means when said receptacle means are pivoted relative to each other at a predetermined angle.

7. The apparatus as in claim 6 wherein said container means is a tray having opposite margins diverging from each other, each of said margins having at least one hole, and said receptacle means each having at least one corresponding pin for engaging in said holes, respectively, to thereby enable interengagement of said receptacle means and said tray.

8. Apparatus for supporting receptacles for selected medical and dental devices to, among other things, enable convenient access to said devices by right- and left-handed operators, said apparatus comprising:

link means rotatable about a first axis, a plurality of receptacle means respectively constructed and arranged for holding devices of different kinds, connecting means respectively joined with said receptacle means and pivotally connected to said link means for pivoting about axes, respectively, which are radially displaced from and substantially parallel to said first axis, whereby pivoting said receptacle means on said link means about their respective axes through a substantial angle and revolving said link means and said receptacle means through a substantial angle will cause said receptacle means to be transposed from one side to another of said first axis, tray means comprising sides which diverge from each other at an included angle, means for engaging said tray means with one and the other of said receptacle means when said receptacle means are pivoted to diverge at said angle from said first axis, such that said tray means may be supported between said receptacle means for eithr transposition thereof.

9. The apparatus as in claim 8 wherein:

said receptacle means each have substantially equal widths and said radial displacements of each of said pivot axes are equal and said axes align substantially with the center of said receptacle means respectively, whereby said receptacles may be symmetrically disposed about said first axis and in contact with each other for either transposition.

10. The apparatus as in claim 8 wherein:

said receptacle means each have front and rear ends and spaced apart sides with at least a portion of one side of each of said receptacles being parallel to a portion of another side of the same receptacle, and each of said pivot axes being displaced an equal distance from said first axis, so that said receptacle sides may be placed in parallel contacting relationship with each other with transposed to either side of said first axis.

11. The apparatus as in claim 8 wherein:

said receptacle means each have front and rear ends and spaced apart sides, and instrumentalities of one kind projecting from said front end of one receptacle and instrumentalities of another kind projecting from said front end of the other receptacle for being grasped by an operator.

12. The apparatus as in claim 8 including:

first arm means on which said link means is supported for rotation about said first axis, second arm means pivotally connected to said first arm means for swinging about an axis that is substantially parallel to said first axis, tray means mounted proximate to an end of said second arm means, said tray means being swingable with said second arm means in a plane other than a plane occupied by said receptacle means for any pivoted position of said receptacle means.

13. The apparatus as in claim 8 wherein:

said receptacle means each have a rear end adjacent said pivot axes and a front end more remote from said axes, at least one of said receptacle means having extending from its front end an instrument accessible to an operator, plunger means extending from said front end adjacent said instrument, said plunger means being biased in one direction and being movable in opposition to said bias in another direction to activate said instrument, plate means and means at said front end for supporting said plate means for rocking, said plunger means being in contact relation with said plate means, whereby a hand of an operator may grasp said instrument and rock said plate means simultaneously to activte said instrument as it is withdrawn.

14. The apparatus as in claim 8 wherein:

said receptacle means each have a rear end adjacent said pivot axes and a front end more remote from said axes, at least one of said receptacle means having a plurality of withdrawable instruments extending therefrom and manually accessible to an operator, a plurality of plunger means corresponding in number with said instrument in said one receptacle and each extending from said front end adjacent the instrument to which it relates, said plunger means each being biased in one direction and movable in opposition to said bias in another direction to activate a corresponding instrument, plate means and means at said front end for supporting said plate means for rocking in various directions, said plunger means being in contact relation with said plate means and normally biasing it against rocking, whereby a hand of an operator may grasp an instrument and simultaneously rock said plate means toward a plunger means associated therewith to thereby activate only the instrument that is grasped.

15. The apparatus in claim 8 including:

support means and bearing means supporting said link means for rotation on said support means about sid first axis said bearing means having an opening coincident with said first axis, a plurality of elongated flexible means for selectively cooperating with devices in said receptacle means, at least one of said flexible means having a portion extending in the same general direction as said first axis through said opening in said bearing means and having another continuous portion extending into said receptacle means.

16. The apparatus as in claim 8 wherein:

each of said receptacle means comprises a generally similarly shaped box-like means each having straight sides and each having inner and outer ends, at least one device of one kind extending from said outer end of one receptacle means and at least one device of another kind extending from said outer end of said other receptacle means, said connecting means, respectively, engaging said inner ends of said receptacle means substantially in the mid-plane between said sides of each receptacle means to enable a side of one receptacle means to be positioned in contact with a corresponding side of the other receptacle means.

17. The apparatus as in claim 15 wherein: said support means comprises first hollow arm means extending generally in a first plane to which said first axis is substantialy perpendicular, said flexible mans extending through said hollow arm means.

18. The apparatus as in claim 16 wherein:

first hollow arm means and bearing means supporting said link means for rotation on said arm means about said first axis, said bearing means having an opening coincident with said first axis, said inner ends of said receptacle means each having an opening, a plurality of elongated flexible means extending through said first arm means and through said opening in said bearing means and at least one of said flexible means extending in one direction along said link means into a said opening in one said inner receptacle end and at least another of said flexible means extending in another direction along said link means and into said opening in the other said inner receptcle end.

19. The apparatus as in claim 16 including:

arm means comprising members which are extensible and contractible relative to each other, one of said members being pivotally connected to said first hollow arm means for swinging in a plane generally parallel to the plane in which said receptacles pivot, and tray means supported on aother of said arm means members.

20. The apparatus as in claim 16 including:

tray means for extending between said box-like receptacles when said receptacles are pivoted to a predetermined angle of separation between them, and means for attaching said tray means to at least one of said receptacle means to thereby support said tray means.

21. The apparatus as in claim 19 wherein said tray means is pivotally supported on said member.

22. The apparatus as in claim 20 wherein:

said tray means has opposite margins for being disposed on said receptacle means, respectively, said margins each having at least one hole, and pin means projecting from said receptacle means, respectively, for engaging in the holes in said margins of said tray means.

* * * * *